Figure 1:
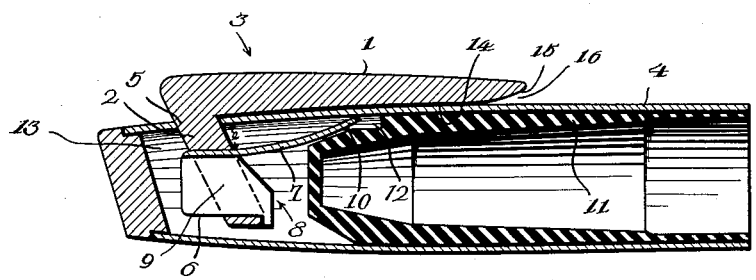

May 8, 1962  YOSHITAKA FURUKAWA  3,032,843

CLIPPING DEVICE

Filed Dec. 30, 1958

Inventor

Yoshitaka Furukawa

By George B. Cnijeso

Attorney 3,032,843
CLIPPING DEVICE
Yoshitaka Furukawa, 748 Komaba-machi,
Meguro-ku, Tokyo, Japan
Filed Dec. 30, 1958, Ser. No. 783,950
3 Claims. (Cl. 24—11)

This invention relates to a clipping device and more particularly to a clip for a fountain-pen, sharp pencil, etc. having a wide contact surface of pressure, easily attachable and hard to detach.

The clipping device for fountain-pen or sharp pencil, etc. heretofore in existence, is provided with a swelled part of a ball or other shape on its sharp end and all the pressure to the clipping wall of the cap or barrel is centralized on this point. However, in order to prevent the clip from falling off the pocket, it is necessary to give quite a strong pressure on said contact point, since it is centralized on one point and supported by this small contact surface. Hence, it is difficult to clip a fountain-pen, etc. with one hand. Not only may it destroy the pocket but also there is danger that the fountain-pen may fall off the pocket. Moreover, its durability is not satisfactory.

An object of the invention is to provide a clipping device wherein the surface opposite to the clipping wall of the cap or barrel forming the main part of the clip is made in such a way that the whole surface of said part contacts with said clipping wall. The base needing no elasticity and a plate spring are made of one single piece forming the clipping pressure source and by means of this prevents the fountain-pen from falling off the pocket and also damage of the pocket.

A further object of the invention is to provide a clipping device wherein the surface opposite to the clipping wall forming the main part of the clip has a non-contact part, contrary to the existing clip and by means of which clipping is performed perfectly with one hand and there is no danger that the pen falls off the pocket.

Other objects and advantages of the invention will appear from the following description of the invention.

In the drawings:

FIG. 1 is a longitudinal side-section view through the fountain-pen cap of one application mode of this invention.

Figure 2:
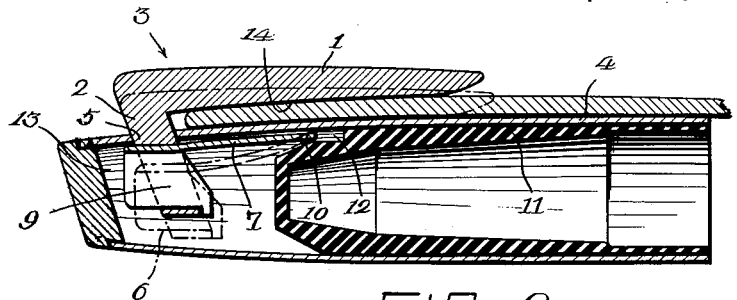

FIG. 2, a longitudinal side-sectional view through the same cap where the clip of FIG. 1 is holding an object.

Figure 3:
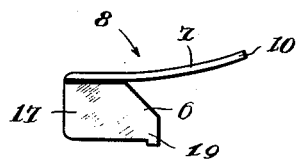

FIG. 3, a side-view of the clip spring in FIG. 1.

Figure 4:
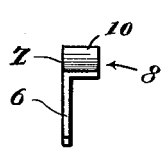

FIG. 4, a left side-view of FIG. 3.

Figure 5:
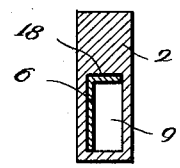

FIG. 5, a diagram showing insertion of the clip spring into the clip main part.

Figure 6:
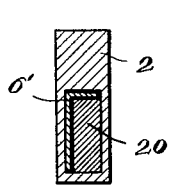

FIG. 6, a diagram showing an example different from the one shown in FIG. 5.

Figure 7:
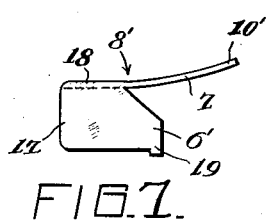

FIG. 7, a side-view of the clip spring in another example of FIG. 3.

Figure 8:
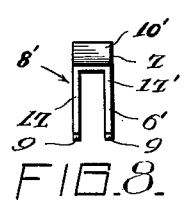

FIG. 8, a left side-view of FIG. 7.

Figure 9:
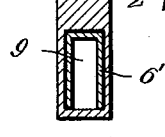

FIG. 9, a diagram showing insertion of the clip spring in FIGS. 7 and 8 into the clip main part.

Figure 10:
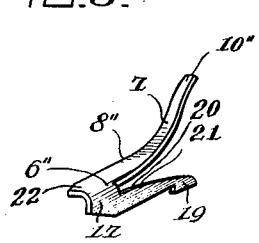

FIG. 10, an oblique view of another clip spring.

Referring to the drawings for more specific details of the invention, and as shown in FIG. 1, the clip 3 consisting of a main part 1 and a foot 2 making an acute angle with said clip main part, said foot 2 is inserted into a window 5 bored on the clipping wall 4 of the cap or barrel. The base part 6 needing no elasticity for itself and the plate spring 7 of the clip spring 8 are made of one single piece, the base 6 of which is inserted into a hole bored on said foot 2. The base of said clip spring 8 is provided with a wall 4 and a space $l$, the end 10 opposite to the base 6 of the plate spring 7 is supported by contact with the inner wall of the clipping wall 4.

In the drawings, 11 shows an inner cap medium inserted into the inner wall of the clipping wall. 12 is a channel dug on the outer cap side 13 of said inner cap medium and into which the end 10 of the plate spring 7 is inserted.

As shown in FIG. 1, the lower surface 14 of the main part 1 of the clip 3, usually forms a curved surface contacting the outer circumference of the clipping wall 4, while the surface of the end 15 opposite to the foot 2 does not contact the outer circumference of the clipping wall 4. Hence, there is a gap between the outer circumference of 4 and the lower surface 15 of the end. The foot 2 making an acute angle with the lower surface 14 and as shown in FIG. 1, both the upper and the lower surfaces of the hole 9 having a rectangular section are nearly in parallel with the lower surface 14 of the clip main part 1. The upper surface of the hole 9 is bored at a distance of nearly $l$ from the lower surface 14 of the clip main part. The clip spring 8 inserted into said hole 9 is consisted of a base 6 and a plate spring 7 and made of one single piece. Said base 6 may take any shape or be made in any construction provided it is perfectly adapted to the shape of the hole 9. Anything may suffice unless it reduces greatly the action of the plate spring 7; said part does not perform any spring action for itself. Therefore, in FIGS. 3 and 4 are shown an application mode wherein a clip spring 8 having the base 6 of an L-shape section consisting of a vertical plate part 17 and a horizontal plate part 18 continuing to the plate spring 7, said two parts being made of a plate spring cut and folded. As shown in FIG. 5, said base is inserted into the hole 9 bored on the foot 2 of the clip 3 and stopped by means of the piece 19 protruded from the lower edge of the end 7 of the vertical part 17. The plate spring 7 continuing to the horizontal part 18 leans toward the outside. The base 6 of the clip spring 8 is inserted into the hole 9 of the foot 2. However, it is desirable that the inserted part be reinforced by means of a plug 20. FIGS. 7 and 8 show another application mode of the clip spring, the base of which has a U-shape section, while the above has a L-shape one. Hence, said clip spring has vertical parts 17, 17' on both side edges if the horizontal plate part 18. The clip spring of this kind being strongly introduced into the hole 9, the root of the spring is also strong and durable. The clip spring 8 shown in FIG. 10 is suited when a stronger elasticity is required. It is consisted of a horizontal part 18 and a vertical part 17. The base 6 has an L-shaped section. Said vertical part 17 is provided with an open portion 20. The rear vertical part 21 and the rear horizontal part 22 stand opposite to each other with a space of the open portion 20 between them.

The present invention being constructed as described above, when the object to be clipped is inserted between the lower end 14 of the clip main part 1 and the clipping wall 4, the clip 3 and the clip spring 8 will remove from the position indicated by the dotted line to that indicated by the full line and owing to restoring elasticity of the plate spring the object will be pushed between the clipping wall and the whole lower surface 14 of the clip main part 1. In this case, since the foot 2 is leaned toward the lower surface 14 at an acute angle the clip 3 can be moved upward for a space of $l$ against the restoring power of the plate spring 7 without moving to the right the contact fulcrum of the end 10 of the plate spring 7 with the wall 4. If it were a right angle instead of an acute angle, the foot 2 would not be able to move upward from the window 5 unless the fulcrum of contact of said end 10 with the inner surface of the clipping wall slides to the right. Moreover, suppose the fulcrum of contact be moved in this way, since the elasticity of the plate spring 7 is not fully operated, the function of the clip would not be accomplished. When the clip is put on the pocket, because of this gap 16, insertion of the object to be clipped is made easy. At the start, the right end (lower surface side 15 of the sharp end) of the clip main part 1 only moves upward while the other end does not. In this state, the pressure of the clip is not so strong compared with the other example in which the part corresponding to the base of this invention is made of a plate spring folded in U-shape and inserted into a hole of the foot. However, as it is inserted more in the pocket, the left end of the clip main part 1 will be moved upward and the elasticity of the plate spring 7 will be fully actuated as clip pressure.

According to this invention, since the object is clipped with the whole lower surface of the clip main part 1, instead of two points or a small part as in the existing clip, although the pressure per unit area is small, the clip is pressed with the whole pressure, there is no danger that the fountain-pen falls off. Though a strong total pressure is given to the clip main part, because of small pressure per unit area, the pocket is not damaged. Moreover, the object to be clipped can be kept assuredly and reliably. Moreover, as there is a gap between the lower surface of the sharp end of the clip main part and the cap, the fountain-pen can be clipped with one hand. Unless the foot side of the clip main part is raised, the clip exercising no strong pressure, a perfect insertion with one hand into the pocket is practicable. If the space $l$ is made larger, the more thick object can be clipped into the pocket.

The present invention may be embodied in other specific forms without departing from the spirit thereof. It is therefore desired that the present embodiments be considered in all respects as illustrative and not restrictive, reference being had to the appended claims rather than the foregoing description to indicate the scope of the invention.

What is claimed is:

1. In a hollow cap having inner and outer walls, which cap is designed to be clipped onto a garment by a clip associated with said cap, in combination therewith; an elongated clip adapted to rest against the outer wall of said cap; a foot integral with said clip, said foot forming an acute angle with the inner surface of said clip which is adapted to rest against said cap outer wall; there being an aperture in said cap, said foot passing therethrough; there being an aperture in said foot towards the toe thereof, which foot aperture is at a distance from said cap inner wall; and a clip spring including a base adapted to be retained by said aperture in said foot and a resilient element retained and biased against said cap inner wall and extending in a direction and substantially parallel to said clip.

2. A device as claimed in claim 1, said aperture in said foot being of rectangular cross-sectional shape, said clip spring base having an inverted L-shaped cross section, said resilient element being an outwardly biased integral portion of said inverted L-shaped wing, and, a protrusion on said base, opposed to said resilient element defining the portion of said base entering said aperture.

3. A device as claimed in claim 1, said aperture in said foot being of rectangular cross-sectional shape, said clip spring base having an inverted U-shaped cross section, said resilient element being outwardly biased and an integral portion of said U base, and, a protrusion on at least one of said U arms defining the portion of said base entering said aperture.

References Cited in the file of this patent

UNITED STATES PATENTS

| 1,350,412 | La France et al. | Aug. 24, 1920 |
| 1,609,530 | Widmer | Dec. 7, 1926 |
| 2,473,690 | Olson et al. | June 21, 1949 |
| 2,531,113 | Davis | Nov. 21, 1950 |
| 2,694,843 | Marshall | Nov. 23, 1954 |

FOREIGN PATENTS

| 1,048,242 | France | July 29, 1953 |
| 1,087,151 | France | Aug. 18, 1954 |
| 1,183,479 | France | Jan. 26, 1959 |
| 14,574 | Great Britain | of 1890 |